United States Patent
Rüdiger et al.

(10) Patent No.: US 12,543,751 B2
(45) Date of Patent: Feb. 10, 2026

(54) APPARATUS AND METHOD FOR CUTTING FREE THE FLANK BONES OF BEHEADED, SLAUGHTERED FISH

(71) Applicant: NORDISCHER MASCHINENBAU RUD. BAADER GMBH + CO. KG, Lübeck (DE)

(72) Inventors: Tim Rüdiger, Lübeck (DE); Eugen Wittich, Lübeck (DE); Matthias Schröder, Lübeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 151 days.

(21) Appl. No.: 18/570,547

(22) PCT Filed: Jun. 15, 2022

(86) PCT No.: PCT/EP2022/066307
§ 371 (c)(1),
(2) Date: Dec. 14, 2023

(87) PCT Pub. No.: WO2022/268602
PCT Pub. Date: Dec. 29, 2022

(65) Prior Publication Data
US 2024/0215594 A1 Jul. 4, 2024

(30) Foreign Application Priority Data
Jun. 23, 2021 (EP) .................................. 21181169

(51) Int. Cl.
*A22C 25/00* (2006.01)
*A22C 25/08* (2006.01)
*A22C 25/16* (2006.01)

(52) U.S. Cl.
CPC .............. *A22C 25/16* (2013.01); *A22C 25/08* (2013.01)

(58) Field of Classification Search
CPC ............................... A22C 25/16; A22C 25/08
(Continued)

(56) References Cited

U.S. PATENT DOCUMENTS

| 4,688,297 A | * | 8/1987 | Bartels | ................. A22C 21/003 452/165 |
| 5,149,297 A | | 9/1992 | Braeger et al. | |

(Continued)

FOREIGN PATENT DOCUMENTS

| CN | 103781360 A | 5/2014 |
| CN | 105120673 A | 12/2015 |

(Continued)

OTHER PUBLICATIONS

CN First Office Action dated Jun. 18, 2025 pertaining to CN application No. 202280044849.1 filed Jun. 15, 2022, pp. 1-13.

*Primary Examiner* — Richard T Price, Jr.
(74) *Attorney, Agent, or Firm* — Dinsmore & Shohl LLP

(57) ABSTRACT

An apparatus to cut free flank bones of beheaded, slaughtered fish, which preferably have opened abdominal cavities and are transported tail-first in transport direction T with their backbone resting on transport saddles, includes: an upper bone guide to guide the backbone from the dorsal side; a lower bone guide to guide ventral spokes of the fish, which spokes are formed in the region from the tail to the abdominal cavity; and a separating unit for detaching fillets from the flank bones surrounding the abdominal cavity. The separating unit includes a separating means having a corresponding counter unit and can be brought from a standby into a working position and vice versa. A detaching device is located in the upper bone guide region to loosen the bone connection between the flank bones and backbone of at least (Continued)

some of the flank bones. A corresponding filleting machine and method are provided.

20 Claims, 7 Drawing Sheets

(58) Field of Classification Search
USPC .......................................................... 452/135
See application file for complete search history.

(56) References Cited

U.S. PATENT DOCUMENTS

| | | | |
|---|---|---|---|
| 5,871,395 A | 2/1999 | Grabau et al. | |
| 6,322,437 B1 * | 11/2001 | Grabau .................. | A22C 25/16 |
| | | | 452/161 |
| 7,090,574 B2 * | 8/2006 | Braeger ................. | A22C 25/16 |
| | | | 452/161 |
| 8,272,928 B2 * | 9/2012 | Finke ..................... | A22C 25/16 |
| | | | 452/161 |
| 9,125,424 B2 * | 9/2015 | Jurs ........................ | A22C 25/16 |

FOREIGN PATENT DOCUMENTS

| | | |
|---|---|---|
| DE | 2538430 A1 | 3/1977 |
| DE | 9101085 U1 | 5/1992 |
| EP | 0771530 A1 | 5/1997 |

* cited by examiner

APPARATUS AND METHOD FOR CUTTING FREE THE FLANK BONES OF BEHEADED, SLAUGHTERED FISH

CROSS-REFERENCE TO RELATED APPLICATIONS

This application is the U.S. National Stage of PCT/EP2022/066307 filed on Jun. 15, 2022, which claims priority to European Patent Application 21181169.0 filed on Jun. 23, 2021, the entire content of both are incorporated herein by reference in their entirety.

FIELD OF THE INVENTION

The invention relates to an apparatus configured and adapted to cut free flank bones of beheaded, slaughtered fish which preferably have opened abdominal cavities and which are transported tail-first in transport direction T with their backbone resting on transport saddles, said apparatus at least comprising an upper bone guide which is configured and adapted to guide the backbone from the dorsal side of the fish to be processed; a lower bone guide which is configured and adapted to guide ventral spokes of the fish to be processed, which spokes are formed in the region from the tail to the abdominal cavity; and a separating unit for detaching fish fillets from the flank bones surrounding the abdominal cavity of the fish to be processed, the separating unit comprising a separating means having a corresponding counter unit and having the ability to be brought from a standby position into a working position and vice versa.

The invention is further concerned with a filleting machine for filleting beheaded, slaughtered fish which preferably have opened abdominal cavities, comprising dorsal knives for exposing the dorsal spokes up to the backbone; ventral knives for exposing the ventral spokes, which spokes extend from the tail to the abdominal cavity, up to the backbone; an apparatus for cutting free flank bones; separating knives for separating the fillets from the backbone in the tail region by cutting through the ligament around the backbone left by the ventral and dorsal knives; an endless conveyor for transporting the fish tail-first as well as a number of transport saddles arranged on the conveyor for securely receiving the fish in their abdominal cavities.

In addition, the invention relates to a method for filleting beheaded, slaughtered fish which preferably have opened abdominal cavities, comprising the steps: transporting the fish to be processed tail-first through a filleting machine in transport direction T; cutting free the dorsal spokes up to the backbone; cutting free the ventral spokes up to the backbone; cutting free the flank bones; and separating the fillets from the backbone in the tail region by cutting through the ligament left around the backbone when cutting free the dorsal and ventral spokes.

BACKGROUND OF THE INVENTION

Such apparatuses and filleting machines as well as methods are used in the fish processing industry to automatically fillet fish, particularly of the salmon, white fish and other species. However, the anatomy and in particular the structure of the skeleton vary from species to species. What the fish have in common is a central backbone (also referred to in the following as central bone or spine). Towards the back, dorsal spokes, also referred to as back spokes, extend upwards along the backbone in a substantially vertical direction. From the tail region up to the beginning of the abdominal cavity, ventral spokes, also referred to as belly spokes, extend downwards in a substantially vertical direction. The course of the flank bones and their configuration often differ; the flank bones are formed along the backbone in the region of the abdominal cavity on both sides of said abdominal cavity. While the flank bones of white fish, for example, extend from the central bone obliquely and substantially linearly or with only a slight downward curve around the abdominal cavity, the flank bones of sea bass, for example, are more curved. Using the sea bass species as an example, the flank bones, in particular those located at the head end of the abdominal cavity, initially extend substantially horizontally from the backbone, in order to then extend downwards in a larger arc around the abdominal cavity. Furthermore, the flank bones of sea bass, for example, are stronger and thicker, particularly the flank bones located towards the head end of the abdominal cavity. In other words, the species differ in the shape or orientation and stability of the flank bones.

An essential work step during automatic filleting of the fish is releasing the fillets from the flank bones, that is the so-called rib cages which extend on both sides of the backbone and surround the abdominal cavity of the fish. To do this, the fish are transported by means of transport saddles to the individual processing tools, inter alia also to the apparatus for cutting free the flank bones. The upper and lower bone guides are used to hold or guide the fish in the optimum processing position on the transport saddle. The separating unit is usually arranged on both sides of the fish to be processed, so that the fillets can be separated from the flank bones in parallel or with a time delay. The separating means and the counter unit define a cutting gap. When cutting free flank bones which do not have a very pronounced curved structure, i.e. the flank bones are if anything linear/flat in the plane of the plane defined by the separating means or the counter unit, as is the case with the white fish species, for example, the flank bones can be guided into the cutting gap by the separating means and a chamfer provided on the separating means.

In sea bass and comparable species, the arch structure of the flank bones, i.e. the costal arch structure, is particularly pronounced. This means that the flank bones have a stronger curve and describe a larger arc. The flank bones also have a particular stability, particularly the flank bones which extend from the backbone at the head end of the abdominal cavity. As the curvature and stability of the flank bones increases, the process of cutting free the flank bones becomes less reliable. Since the flank bones do not fit at least partially through the cutting gap formed between the separating means and the counter unit, there is a risk of cutting into the flank bones with the result that the flank bones remain completely or partially on the fillet, which significantly increases the subsequent trimming effort, i.e. in particular the removal of flank bones or parts thereof.

It is therefore the object of the present invention to propose an apparatus for cutting free the flank bones of fish which optimises automated filleting, in particular for species with a pronounced costal arch structure, such as sea bass. The object of the invention is also to propose a corresponding filleting machine and a corresponding method.

SUMMARY OF THE INVENTION

This object is achieved by an apparatus having the features referred to at the outset in that a detaching device is arranged in the region of the upper bone guide which is configured and adapted to at least loosen the bone connection between the flank bones and the backbone of at least some of the flank bones. By means of the detaching device according to the invention, it is possible for the first time to have a preferably selective load act on the region where the flank bones connect to the backbone in order to at least fracture the flank bones. The wording "to at least loosen" is to be understood as fracturing of the permanent bone connection between a flank bone and the backbone or a vertebral body without the flank bone being completely detached from the backbone with all residual connections. Even if there is still a residual connection between the flank bone and the backbone, e.g. in the form of residual connections of bone material and/or other connective material, e.g. tissue, the resistance of the at least fractured/cracked flank bones is at least partially broken, so that the flank bones can be brought into a position suitable for the further filleting process, in particular can be guided into or through the cutting gap between separating means and counter unit. Loosening does not exclude complete loosening, i.e. detachment. The wording "at least some of the flank bones" expresses the fact that not all flank bones must necessarily be partially or completely loosened, but that they may be partially or completely loosened. In an automated and particularly effective manner, the apparatus according to the invention makes the flank bones capable of being brought into a forced position suitable for cutting free the flank bones by at least partially loosening the flank bones and guiding the loosened flank bones into said position in which they are guided into and through the cutting gap. This means that the fillets cut free from the flank bones are free of flank bones and/or their residues, so that possible subsequent work in the form of trimming the cut off fillets can be significantly reduced.

Advantageously, the detaching device is configured and adapted to at least loosen the bone connection between the flank bones and the backbone of at least the flank bones located towards the head region, i.e. at the head end of the abdominal cavity of the fish to be processed, on both sides of the backbone. The flank bones become increasingly stronger and firmer in their connection to the backbone towards the head end and also more pronounced in terms of their curvature. The detaching device is configured and adapted accordingly, in particular to come into unavoidable contact with these flank bones, which are located particularly far outside the plane defined by the separating means or the counter unit, in which plane the cutting gap is also located, since they are particularly strongly curved, in order to at least fracture them and guide them into the cutting gap formed between the separating means and the counter unit.

A particularly preferred embodiment is characterised in that the detaching device comprises at least two detaching elements which are positioned or arranged on opposing sides of the upper bone guide. The detaching elements are a simple but nevertheless particularly effective design for applying a detaching force selectively and reliably into the region where the flank bones connect to the backbone in order to at least loosen them. The number of detaching elements as well as their position and arrangement can vary as long as unavoidable contact can be established with the bone connection.

An advantageous development is characterised in that each detaching element comprises a detaching section and a guiding section. This is a particularly effective way of ensuring that during the flank cut, i.e. while the flank bones are being cut free, the detaching elements at least fracture the flank bones with their detaching sections, and then bring them into a preferred forced position with their guiding sections, i.e. press them against the counter unit of the separating unit. This stretches and slightly rotates the at least loosened flank bones so that they are located in the plane defined by the separating means or the counter unit and can be guided under the separating means and thus through the cutting gap. Even the originally stiff and strongly curved flank bones can be guided through the cutting gap intact in this manner, so that the fillets are obtained free of flank bones and/or residues thereof.

A particularly preferred embodiment is characterised in that the detaching section is arranged preceding the guiding section contrary to the transport direction T of the fish to be processed, in such a manner that the flank bones to be loosened first meet the detaching section at least for loosening the flank bones from the backbone and subsequently meet the guiding section for guiding the at least loosened flank bones into a cutting gap existing between the separating means and the counter unit of the separating unit. This configuration ensures the inevitable loosening and positioning in the desired forced position while the fish to be processed are transported through the apparatus.

Advantageously, the detaching section is configured to be sharp-edged at least in sections at least on a detaching edge directed towards the flank bones, while the guiding section is configured to be blunt at least in sections to form a guiding edge. The sharp-edged detaching edge enables the detaching element to apply a selective force into the connection region between the flank bones and the backbone, so that it is at least fractured reliably. Planar or linear applications of force can also be implemented as an option. The blunt guiding edge effectively ensures that the at least fractured flank bones are securely pressed against the inclined surface of the counter unit and thus guided through the cutting gap underneath the separating means.

An advantageous development is characterised in that the sharp-edged detaching edge extends from a lower edge directed towards the flank bones into the region of a front edge pointing in the opposite direction to the transport direction T of the fish to be processed. With the configuration and extension of the detaching edge, all flank bones can be reliably "picked up" and guided to the lower edge in order to at least use loosening at the lower edge due to the increasing contact pressure between the detaching element and the flank bones for loosening.

Preferably, the blunt guiding edge extends in extension of the sharp-edged detaching edge on the lower edge directed towards the flank bones, the blunt guiding edge additionally having an extension transverse to the transport direction T to form a guiding chamfer. The extension of the guiding edge in lengthening the detaching edge can be continuous or offset. The guiding chamfer ensures that the at least loosened flank bones are pressed into the appropriate/desired forced position, i.e. stretched and rotated slightly onto the counter unit, in order to guide the flank bones through the cutting gap.

A preferred embodiment is characterised in that the lower edge of each detaching element, formed by the detaching edge and the guiding edge, is configured to slope downwards in transport direction T of the fish to be processed. This reduces the distance between the lower edge of the detaching elements and the flank bones during transport of the fish to be processed through the apparatus in transport direction T, whereby the pressure of the detaching elements on the flank bones increases and results in the creation of unavoidable contact for reliably loosening/fracturing of the flank bones, at least of the flank bones at the head end of the abdominal cavity of the fish to be processed.

Expediently, each detaching element is optionally formed in one piece or several parts, the one-piece configuration being preferred for reasons of hygiene.

The detaching elements can be configured as independent components. For example, this independent component can be stationary along the transport path of the fish to be processed, in such a manner that the fish to be processed inevitably strike the detaching elements. The detaching elements can also be actively controlled, for example to move them from a standby position into a working position and back. For this purpose, the detaching elements can be controlled individually or synchronously. Particularly preferably, the detaching elements or their control system are in operative connection with a detection means for identifying fish-specific data, such as size, position and pronouncement of the flank bones, etc. so that the detaching elements are individually controllable. Particularly advantageously, the detaching elements are each connected to the upper bone guide, providing a particularly simple and compact solution to reliably loosening the flank bones.

Advantageously, the detaching elements are fixedly attached to the upper bone guide on the side directed away from the guiding gap of the latter. On the one hand, this configuration makes it possible to strike the connection region between the flank bones and the backbone as close as possible to the backbone in order to achieve effective loosening/fracturing. On the other hand, the tight attachment of the detaching elements to the upper bone guide means that the fillet to be obtained remains free of damage, since it prevents a collision between the fillets already detached from the dorsal spokes by the back knives and the detaching elements.

Optionally, the attachment of the detaching elements to the upper bone guide is configured to be releasable. This means, for example, that they can be replaced quickly and easily in the event of wear. Preferably, however, the detaching elements are configured to be fixed and integral with the bone guide which has a positive effect on cleaning ability and therefore hygiene.

The object is also achieved by a filleting machine of the type referred to at the outset which is characterised in that the apparatus for cutting free the flank bones is configured as disclosed herein. The advantages arising from this have already been described in connection with the apparatus for cutting free, so that reference is made here to the relevant passages to avoid repetitions.

The object is also achieved by a method with the steps referred to at the outset which is characterised in that the flank bones are at least partially loosened in the region of their bone connection to the backbone before being cut free. Loosening at least fractures the permanent bone connection between the flank bones and the backbone, as a result of which the bone connection loses stability and can accordingly be moved/guided more easily into a desired forced position. In other words, the method according to the invention even enables the flank bones of fish species with a pronounced and sturdy flank bone structure, such as sea bass, to be moved/rotated into a plane in which the flank bones, due to the loosening, can be cut free without cutting into them.

Preferably, at least the flank bones located towards the head region are loosened on both sides of the backbone, preferably at least fractured. These flank bones, which extend from the backbone in the head end region around the abdominal cavity in a strongly curved shape and are very stable, are loosened or fractured before the actual cutting free process and brought into a location/position in which they fit through the cutting gap formed between the separating means and the counter unit of a separating unit to cut the flank bones free.

Advantageously, a preferably selective load is applied at least for loosening the bone connection between the flank bones and the backbone in order to separate the permanent connection. The selective application of force in the region of the bone connection can ensure reliable and safe fracturing or breaking through of the bone connection.

A preferred development is characterised in that the selective load on the bone connection increases with the transport of the fish to be processed in transport direction T. This significantly increases reliability and efficiency when loosening, cracking, fracturing and/or breaking through, particularly in the case of flank bones located at the head end of the abdominal cavity of the fish to be processed.

Particularly preferably, the at least loosened flank bones are rotated and guided into a cutting gap formed between a separating means and a counter unit of a separating unit for cutting free the flank bones. Due to loosening and the rigid bone connection which is thus loosened or removed, the loosened flank bones can be pressed, for example during continuous transport of the fish to be processed in transport direction T, contrary to the transport direction T so that the flank bones turn flat, to the side as it were, and are located in the plane defined by the separating means or the counter unit. In other words, the cutting gap is formed in the working position between the flat separating means, for example a circular knife, and the flat counter unit which can be configured as one piece or preferably several parts. The plane defined by the separating means is located substantially parallel to the plane defined by the counter unit, only offset by the size of the cutting gap. To form the cutting gap, the plane of the separating means is located above or below the plane of the counter unit depending on the viewing angle. Accordingly, strictly speaking the flank bones are rotated/pressed onto the surface of the counter unit and guided into a position between the two previously defined planes, namely into the cutting gap, in order to ensure that all flank bones pass through the cutting gap without being damaged.

Particularly preferably, the method is carried out with a filleting machine as disclosed herein. Further advantages arising from this have already been described in detail, which is why reference will be made to the relevant passages to avoid repetitions.

BRIEF DESCRIPTION OF THE DRAWINGS

Further expedient and/or advantageous features and developments of the apparatus and the filleting machine and the corresponding method emerge the description. Especially preferred embodiments are explained in greater detail with reference to the attached drawing. The drawing shows.

DETAILED DESCRIPTION OF THE INVENTION

The illustrated apparatus according to the invention is used for cutting free the flank bones (also referred to in the following as costal arches) of beheaded, slaughtered fish of the sea bass species which preferably have opened abdominal cavities and which are transported tail-first in the direction of fish travel. However, the apparatus can also be used, of course, to release the fillets from the ribs of other fish species. It is also possible to use it for fish that are transported head-first in the direction of fish travel. The invention relates to apparatuses for cutting free the flank bones of beheaded, slaughtered fish which have not yet been opened in their abdominal cavity.

Figure 1:
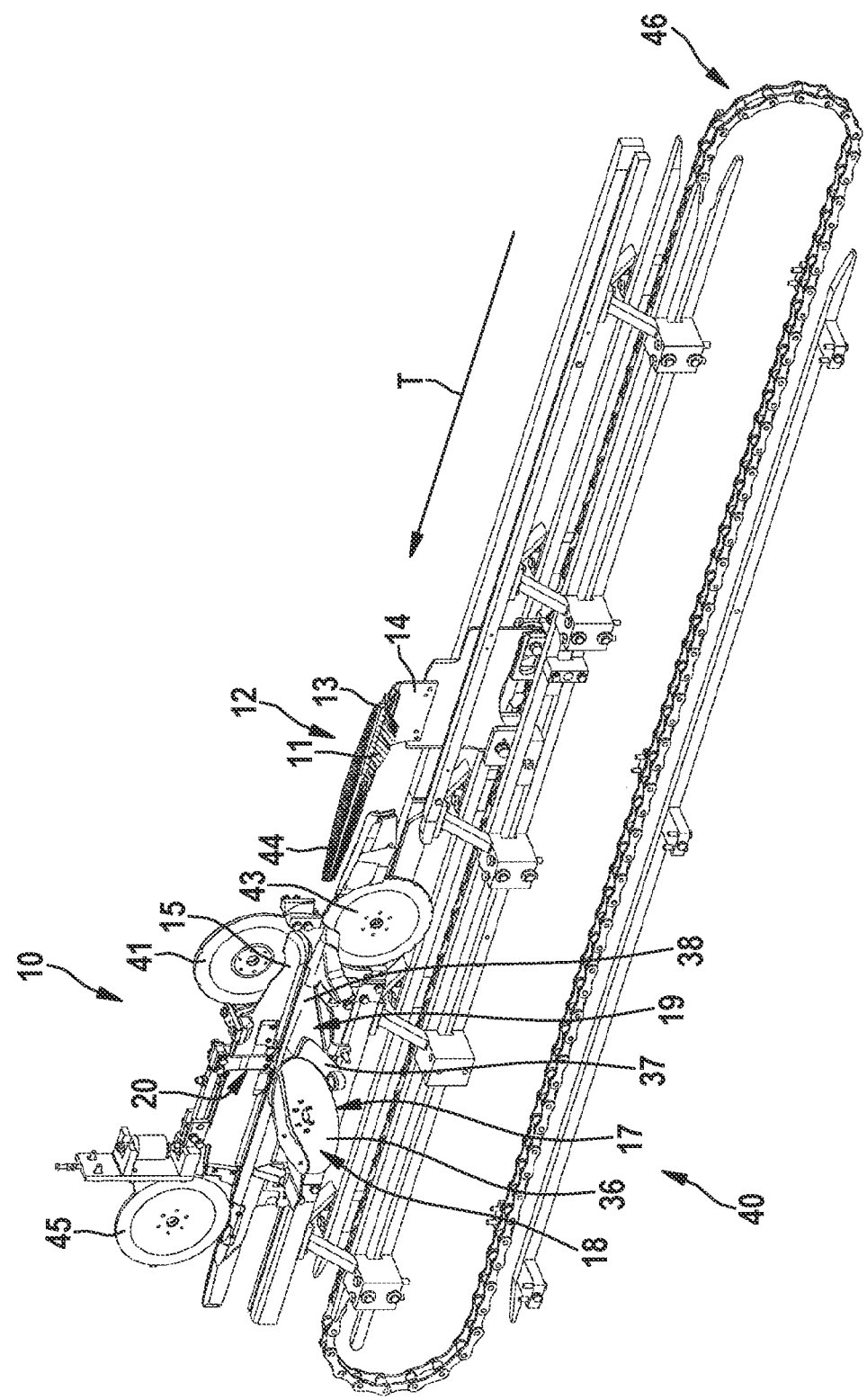
FIG. 1 a perspective view of a filleting machine having an apparatus according to the invention for cutting free the flank bones, FIG. 2 an enlarged diagram of the apparatus according to the invention for cutting free the flank bones, FIG. 3 a sectional view through the apparatus according to FIG. 2 in transport direction T with a flank section of a fish of the sea bass species before the detaching element is in contact with the flank bones, FIG. 4 the view according to FIG. 3 with the detaching device in contact with the flank bones, FIG. 5 an enlarged diagram of the detaching device in perspective view in which the detaching device is arranged fixed to the upper bone guide, FIG. 6 a further embodiment of the detaching device which is configured to be deflectable with respect to the upper bone guide, and FIG. 7 the detaching device according to FIG. 5 in a front view.
Figure 2:
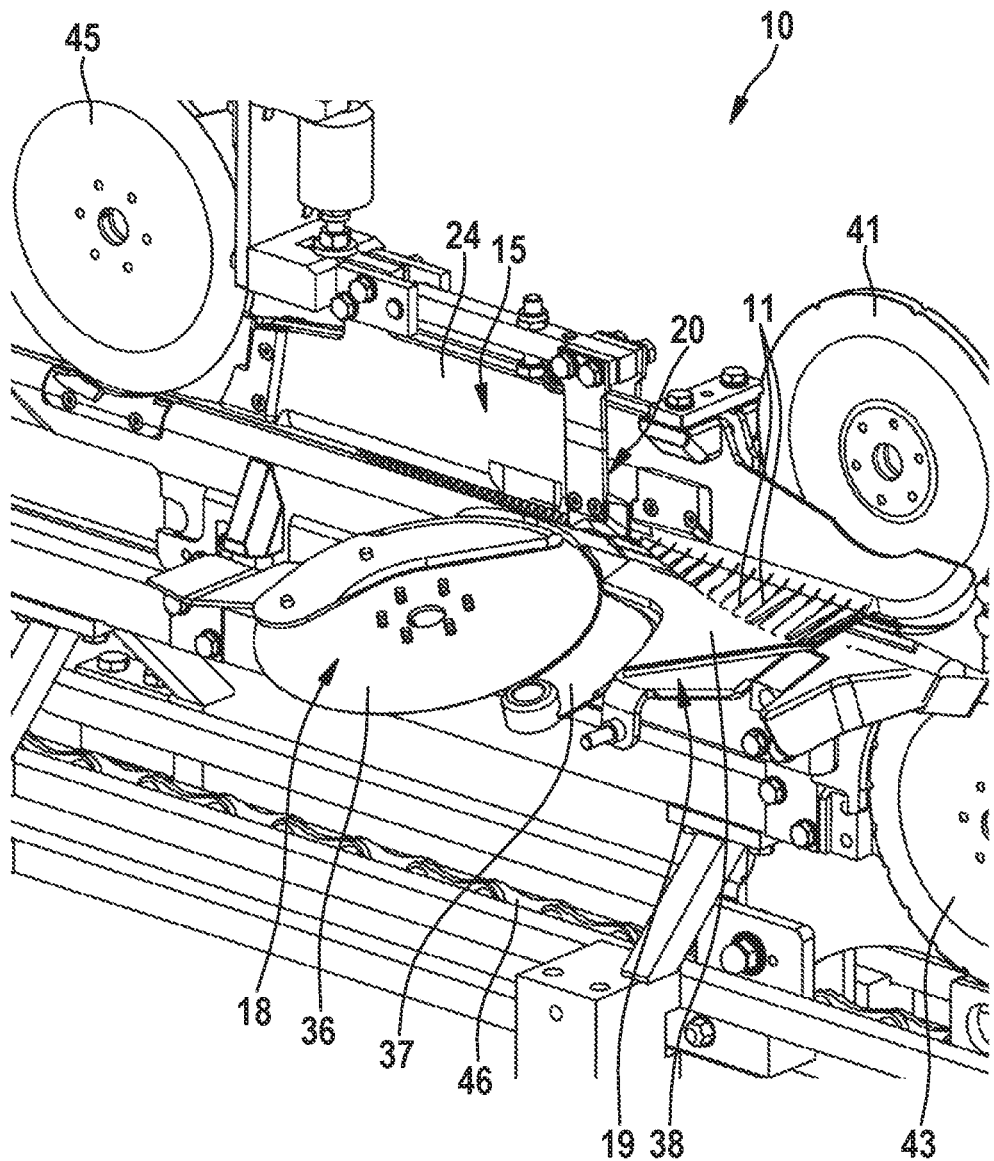

In the apparatus 10 for cutting free the flank bones 11, which is shown in FIGS. 1 and 2, the apparatus 10 is only shown and described for processing of one side of the fish for the sake of better clarity. In practice, however, the components described below are located on both sides of a fish 12 to be processed so that the two fillets of a fish 12 can be detached from the flank bones 11 on both sides, preferably at the same time, but optionally also with a time delay.

The apparatus 10 shown is configured and adapted for cutting free flank bones 11 of beheaded, slaughtered fish 12 which preferably have opened abdominal cavities and which are transported tail-first in transport direction T with their backbone 13 resting on transport saddles 14. This apparatus 10 comprising at least an upper bone guide 15 which is configured and adapted to guide the backbone 13 from the dorsal side of the fish 12 to be processed; a lower bone guide 16 which is configured and adapted to guide ventral spokes 44 of the fish 12 to be processed, which spokes are formed in the region from the tail to the abdominal cavity; and a separating unit 17 for detaching fish fillets from the flank bones 11 surrounding the abdominal cavity of the fish 12 to be processed, the separating unit 17 comprising a separating means 18 having a corresponding counter unit 19 and having the ability to be brought from a standby position into a working position and vice versa.

This apparatus 10 is characterised according to the invention in that a detaching device 20 is arranged in the region of the upper bone guide 15 which is configured and adapted to at least loosen the bone connection 21 between the flank bones 11 and the backbone 13 of at least some of the flank bones 11.

When taken on their own or in combination with each other, the features and developments described below illustrate preferred embodiments. It is expressly pointed out that features which are summarised in the claims and/or the description and/or the drawing or are described in a common embodiment can also further develop the apparatus 10 described above in a functionally independent manner.

In the embodiment shown by way of example, the detaching device 20 is configured and adapted to at least loosen the bone connection 21 between the flank bones 11 and the backbone 13 of at least the flank bones 11 located towards the head region, i.e. at the head end of the abdominal cavity of the fish 12 to be processed, on both sides of the backbone 13. For this purpose, the detaching device 20 comprises at least two detaching elements 22, 23 which are positioned or arranged on opposing sides of the upper bone guide 15. The upper bone guide 15 comprises at least two guiding jaws 24, 25 which are arranged at a distance from each other in such a manner that their free ends directed downwards are configured and adapted to guide the backbone 13 from the dorsal side, and the inner sides of the guiding jaws 24, 25 which are directed towards each other form sufficient space, the so-called guiding gap, to ensure passage of the dorsal spokes 42. From the ventral side, the backbone 13 is guided on the one hand by the transport saddle 14 and on the other hand, particularly in the region from the abdominal cavity to the end of the tail, by the lower bone guide 16.

Each detaching element 22, 23, comprises a detaching section 26, 27 and a guiding section 28, 29. In the embodiment shown, the detaching section 26, 27 is arranged preceding the guiding section 28, 29 contrary to the transport direction T of the fish 12 to be processed, in such a manner that the flank bones 11 to be loosened first meet the detaching section 26, 27 at least for loosening the flank bones 11 from the backbone 13 and subsequently meet the guiding section 28, 29 for guiding the at least loosened flank bones 11 into a cutting gap 39 existing between the separating means 18 and the counter unit 19 of the separating unit 17. The configuration of the detaching sections 26, 27 and the guiding sections 28, 29 can vary, as can the arrangement and assignment of detaching section 26, 27 to the respective associated guiding section 28, 29.

Figure 5:
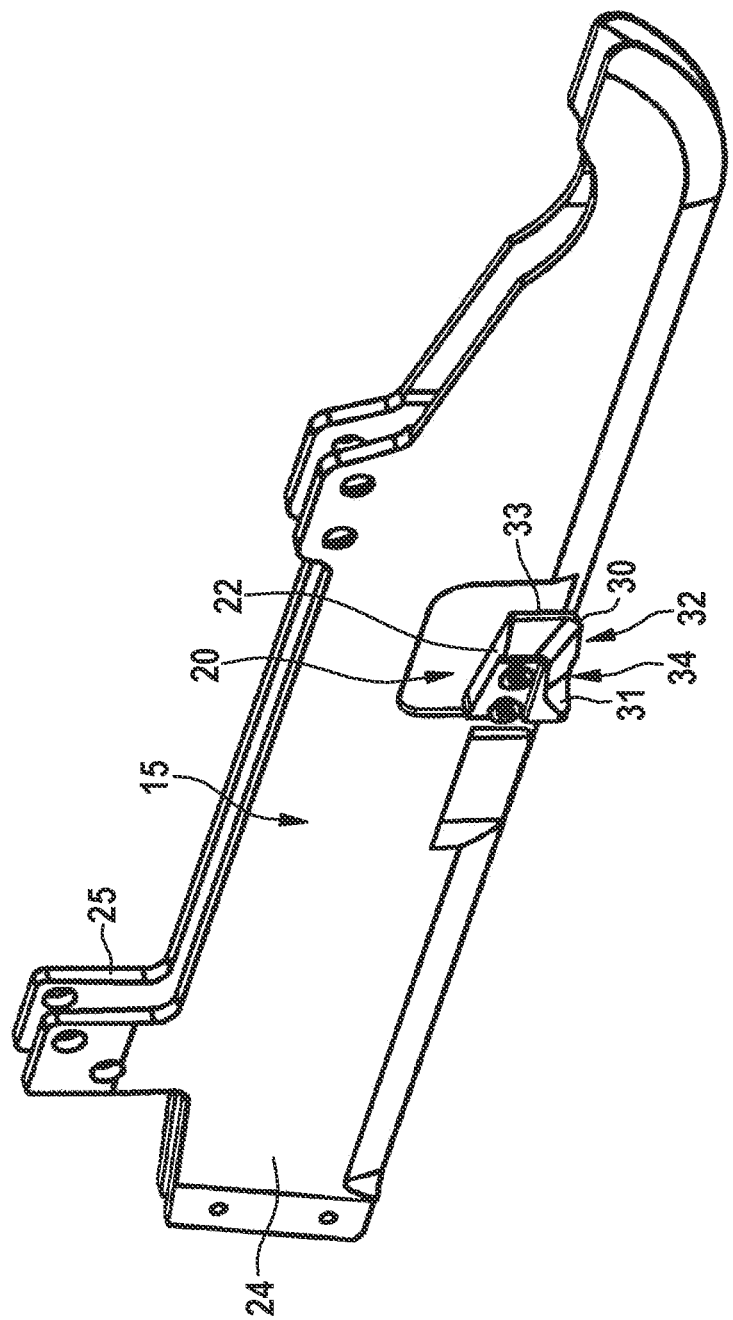

Each detaching section 26, 27 is configured to be sharp-edged at least in sections at least on a detaching edge 30 directed towards the flank bones 11, while each guiding section 28, 29 is configured to be blunt at least in sections to form a guiding edge 31. In the exemplary embodiment according to FIGS. 5 and 6, the sharp-edged detaching edge 30 even extends from a lower edge 32 directed towards the flank bones 11 into the region of a front edge 33 pointing in the opposite direction to the transport direction T of the fish 12 to be processed. Sharp-edged can mean that the detaching edge 30 is actually razor-sharp. In other embodiments, it is sufficient if the detaching edge 30 is provided with flanks running towards each other, in such a manner that fracturing of the flank bones 11 is ensured.

Figure 3:
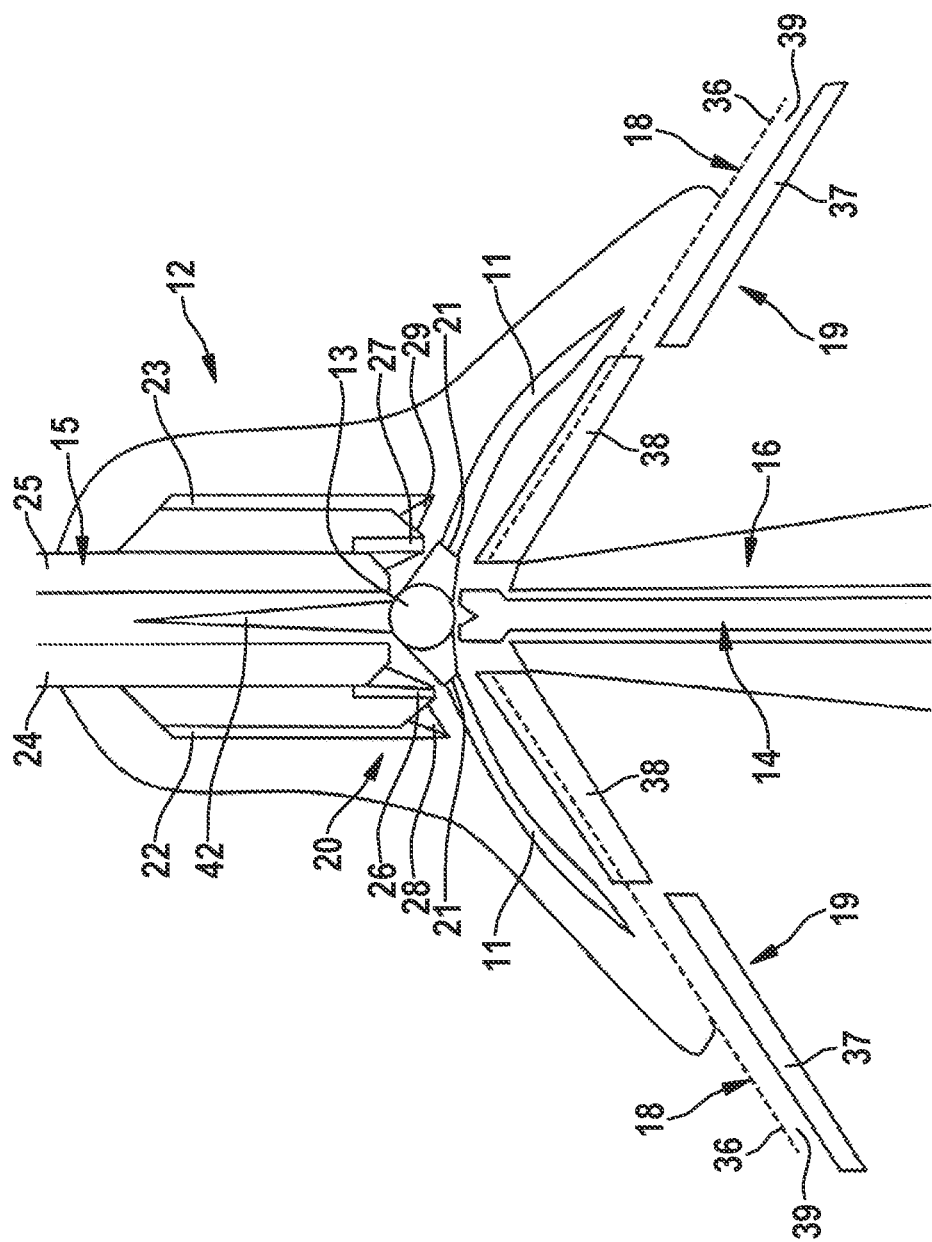
Figure 4:
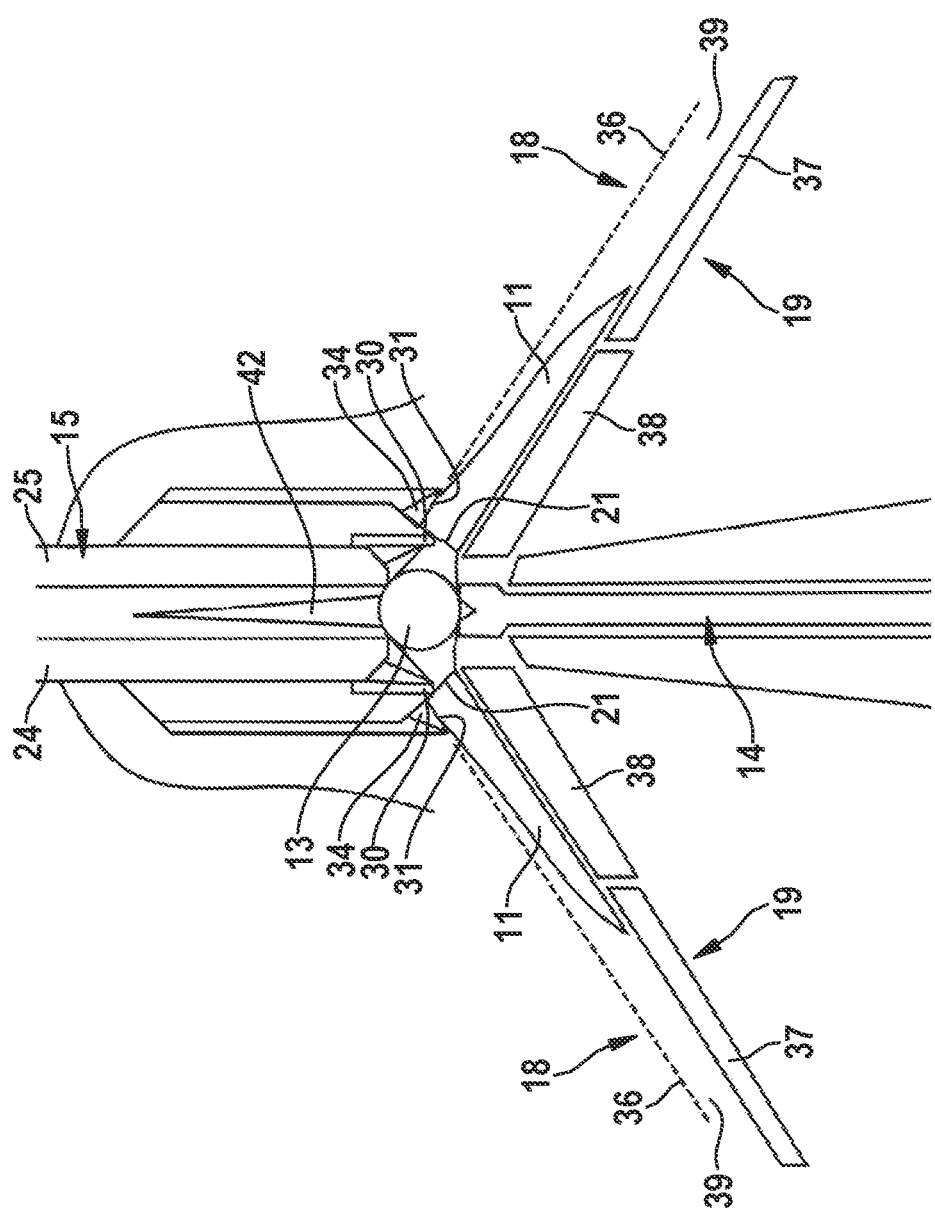

The configuration of the blunt guiding edge 31 and its arrangement or assignment to the detaching edge 30 can also vary. In the embodiment shown, the blunt guiding edge 31 extends in extension of the sharp-edged detaching edge 30 on the lower edge 32 directed towards the flank bones 11, the blunt guiding edge 31 additionally having an extension transverse to the transport direction T to form a guiding chamfer 34. The guiding chamfer 34 is a blunted and bevelled edge which is configured and adapted to press the flank bones 11, which have previously been at least loosened by the detaching edge 30, into the desired position. The desired position is described/defined as one in which the flank bones 11 are brought from their original curved orientation (see in particular FIG. 3) into the rotated and flattened, substantially linear orientation (see in particular FIG. 4) by the guiding chamfer 34 and lie there in order to be guided through the cutting gap 39 between the separating means 18 and the counter unit 19. By means of the guiding chamfer 34, which slopes downwards transverse to the transport direction T starting from the detaching edge 30, the flank bones 11 are pressed against the counter unit 19 until they are located substantially in the plane defined by the counter unit 19 and below the separating means 18, i.e. in the cutting gap 39.

Detaching edge 30 and guiding edge 31 virtually merge into each other in transport direction T. In the preferred embodiment according to the drawing, the lower edge 32 of each detaching element 22, 23, formed from the detaching edge 30 and the guiding edge 31, is configured to slope downwards in transport direction T of the fish 12 to be processed. Preferably, however, the flank bones 11 are not in continuous contact with the lower edge 32 during transport, as the guiding edge 31 is offset vertically to the transport direction T in relation to the detaching edge 30. In other words, the lower edge 32 makes a recess 35 in the transition from the detaching edge 30 to the guiding edge 31. Initially, the pressure of the lower edge 32 on the flank bones 11 is continuously increased by the detaching edge 30 sloping downwards in transport direction T, until the flank bones 11 are at least partially fractured. Then the maximum pressure is first removed from the flank bones 11 by the recess 35 in the lower edge 32 and, on the one hand, is increased again by the guiding edge 31, which is also configured to slope downwards in transport direction T and is inclined obliquely downwards transverse to the transport direction T, and, on the other hand, the flank bones 11 are "folded over" laterally by the guiding chamfer 34 so that they can be guided flat and linearly through the cutting gap.

The detaching elements 22, 23 can be configured as multiple parts. Preferably, however, the detaching elements 22, 23 are configured in one piece. The thickness of the detaching elements 22, 23, i.e. in particular their extension transverse to the transport direction T, is selected on the one hand so that the effect of loosening/fracturing is ensured, and on the other hand so that the fish 12 to be processed, the fish fillets of which are already partially separated from the skeleton by the dorsal incision and ventral incision when they reach the apparatus 10, is not damaged by the detaching elements 22, 23. Optionally, the detaching elements 22, 23 are each connected to the upper bone guide 15. Particularly preferably, the detaching elements 22, 23 are fixedly attached to the upper bone guide 15 on the side directed away from the guiding gap of the latter, see in particular FIG. 5. Specifically, the detaching elements 22, 23 are fixedly attached to the outer sides directed away from each other of the guiding jaws 24, 25 forming the upper bone guide 15. The fixing can be configured releasably. Optionally, the detaching elements 22, 23 are configured in one piece with the guiding jaws 24, 25.

Figure 6:
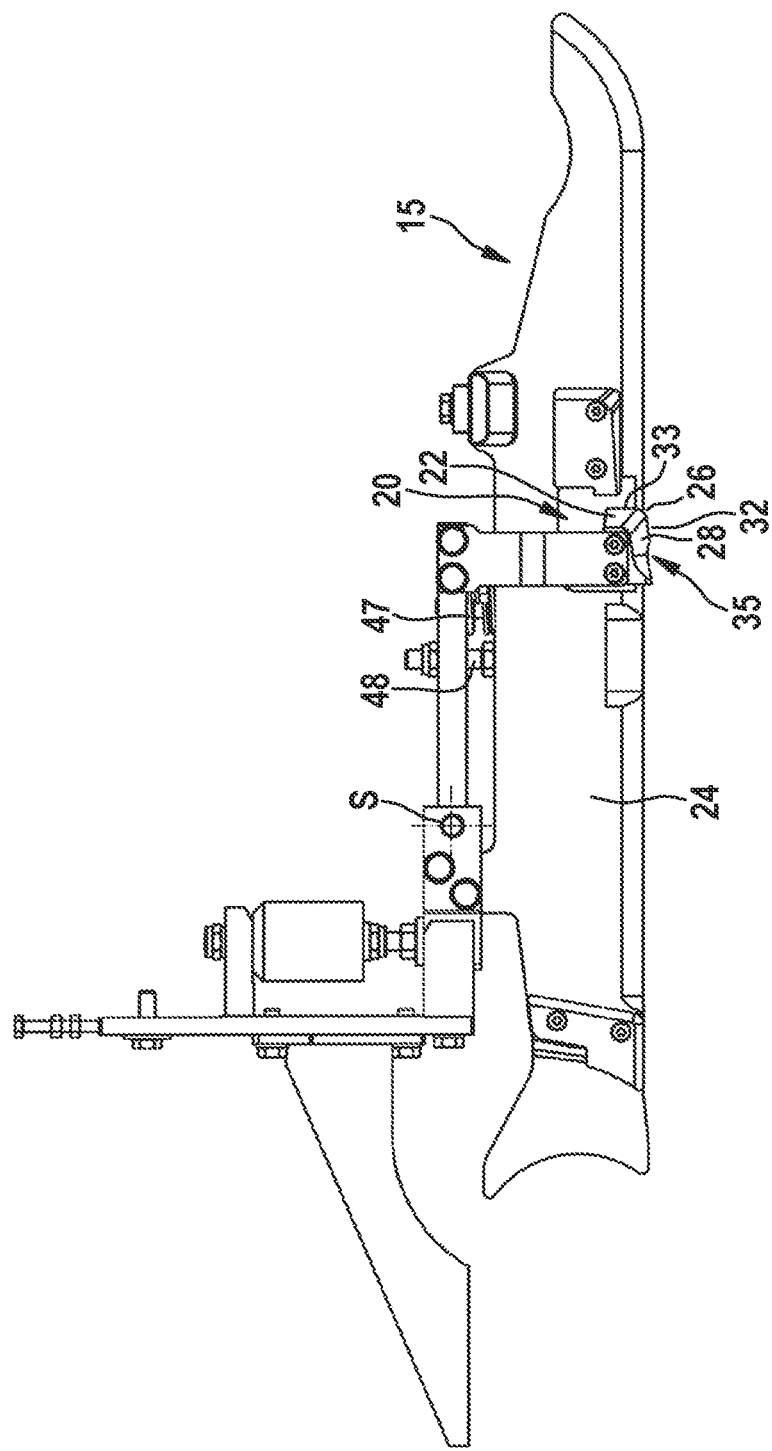
Figure 7:
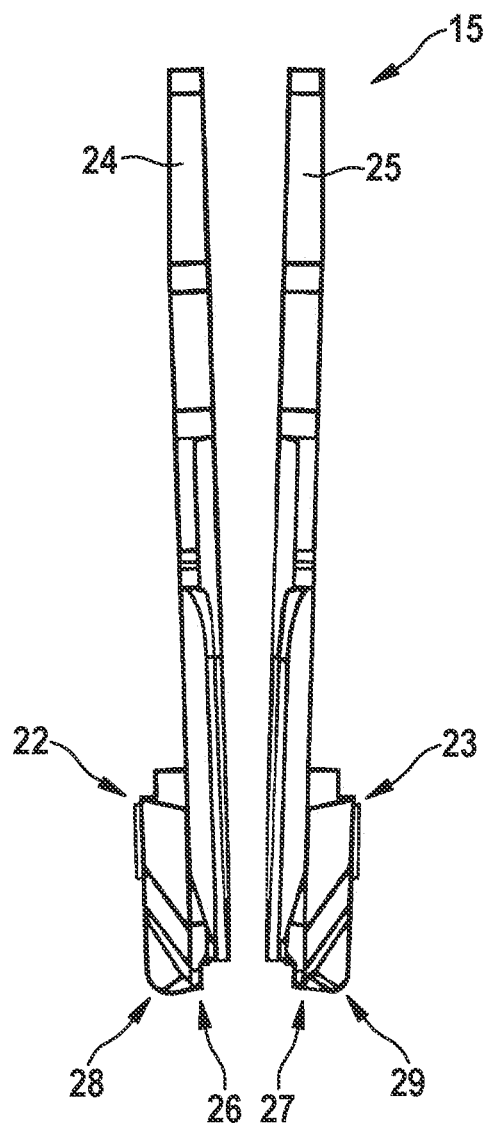

In embodiment elements not shown, a plurality of detaching elements 22, 23 can also be provided one behind the other in transport direction T on one side or both sides of the upper bone guide 15. It is also possible to arrange the detaching elements 22, 23 on a handling device, for example a multi-axis robot arm or the like, the function of which is matched to the control system of the separating unit 17. Other embodiments of detaching elements 22, 23 arranged and configured separately from the upper bone guide 15, which are stationary or movable, can also be used. FIG. 6 shows an exemplary embodiment in which the detaching device 20 is configured to be movable with respect to the upper bone guide 15. For this purpose, the detaching device 20 is pivotable about a pivot point S with respect to the guiding jaws 24, 25 of the upper bone guide 15. The detaching device 20 is held in a lower starting position by means of a spring 47 or an active element, such as a pneumatic cylinder or the like. An abutment 48 limits the downward movement towards the flank bones 11. Optionally, the detaching device 20 or its detaching elements 22, 23 can cooperate with a control system by means of which the detaching elements 22, 23 can be moved from a starting position into a working position and back, in particular in the event that the detaching elements can be actuated, for example by means of a pneumatic cylinder. Means for detecting fish-specific data and information can also be connected to the control system, as can, for example, the conveying means for transporting the fish 12 to be processed through the apparatus 10, so that individual or synchronised control of the detaching elements 22, 23 is ensured.

For a better understanding of the apparatus 10 according to the invention, an exemplary configuration of the apparatus 10 is described, in particular with regard to the configuration of the separating unit 17, it being expressly pointed out that this is only an exemplary option and that the separating unit 17 can also have a different design. By means of the bone guides 15, 16, the fish 12 to be processed, which is usually transported into the region of the separating unit 17 on a transport saddle 14, is held in a defined position in such a manner that the fish 12 lies in a defined situation with respect to the separating unit 17. The separating unit 17 comprises the separating means 18 to which the corresponding counter unit 19 is assigned.

The separating means 18 of the apparatus 10, can be configured, for example, as a rotating circular knife 36 and can be rotatingly driven at variable speed by a drive not explicitly shown. The counter unit 19 is preferably configured in two parts, namely with a fixed supporting element 37, which is configured and adapted to be movable together with the circular knife 36 from the standby position into the working position and back, and with an evadable supporting element 38, which is configured to be movable separately and with respect to the fixed supporting element 37, namely in particular to evade a spring force. The entire separating unit 17 is always in a standby position. The fixed supporting element 37 has a defined gap distance to the circular knife 36 which corresponds in size to the cutting gap 39. For example, the size of the gap distance can be 0.5 mm to 1 mm, but also 2 mm or more.

In the standby position, the evadable supporting element 38 is positioned slightly higher than the fixed supporting element 37. In other words, in the standby position the supporting elements 37, 38 define different planes which are offset in parallel, i.e. they do not form a common plane. The evadable supporting element 38 extends further than the fixed supporting element 37 in the opposite direction to the transport direction T, so that the flank bones 11 first run onto the evadable supporting element 38 when the fish 12 to be processed enters and, where applicable, rest virtually on top of the evadable supporting element 38. As soon as the first flank bones 11 preceding in transport direction T reach the operating area of the circular knife 36, the separating unit 17 is moved upwards from the standby position into the working position. First, the circular knife 36 and the fixed supporting element 37 associated with the circular knife 36 are moved upwards together without changing the constant but adjustable gap distance. As soon as the fixed supporting element 37 is located on a level with the evadable supporting element 38, i.e. the two supporting elements 37, 38 thus form a common flat surface and a common plane which extends parallel to the plane defined by the circular knife 36, a further upward movement of circular knife 36 and fixed supporting element 37 into the final working position results in the evadable supporting element 38 being virtually carried along, e.g. via mechanical drivers or optionally also actively controlled. In the final working position, the cutting gap 39 is then formed between the underside of the circular knife 36 and the common surface of the two supporting sections 37, 38. The movements of circular knife 36 and supporting sections 37, 38 can be carried out linearly for example. However, pivoting movements using suitable drive means are preferred.

Due to the arrangement and configuration of the separating unit 17 described by way of example, the flank bones 11 rest on the evadable supporting elements 38 as they enter the region of the apparatus 10, while the belly flaps of the fish fillets, which have already been partially cut free, extend into the area of the fixed supporting elements 37. The detaching elements 22, 23 of the detaching device 20 accordingly cooperate with the evadable supporting elements 38. The flank bones 11 lie on the surface of the supporting element 38 or are brought into contact therewith by lifting of the supporting element 38 and are subjected to—selective—pressure from above by the detaching sections 26, 27 until they fracture/break and are then rotated by the guiding sections 28, 29 so that they lie flat on the surface of the evadable supporting element 38. In the event that the contact pressure exerted by the detaching elements 22, 23 on the flank bones 11 should become too high, the contact pressure can be compensated or limited by the spring-loaded arrangement/suspension of the evadable supporting element 38. In optional embodiments, an actuating means (not shown) can be provided, which is configured and adapted to actively steer the evadable supporting element 38 away. In other words, the pressure on the flank bones 11 can be controlled and adjusted in a controlled manner by actively actuating the evadably positioned supporting element 38 by means of the actuating means.

The apparatus 10 can be configured as a separate device. In this case, the apparatus 10 itself then comprises conveying means with at least one transport saddle 14. However, the apparatus 10 previously described is particularly preferably a component of a filleting machine 40. The filleting machine 40 for filleting beheaded, slaughtered fish 12 which preferably have opened abdominal cavities comprises back knives 41 for exposing dorsal spokes 42 up to the backbone 13; belly knives 43 for exposing ventral spokes 44, extending from the tail to the abdominal cavity, up to the backbone 13; an apparatus 10 for cutting free flank bones 11; separating knives 45 for separating the fillets from the backbone 13 in the tail region by cutting through the ligament around the backbone 13 left by the belly and back knives 41, 43; an endless conveyor 46 for transporting the fish 12 tail-first as well as a number of transport saddles 14 arranged on the conveyor 46 for securely receiving the fish 12 in their abdominal cavities. According to the invention, this filleting machine 40 is characterised in that the apparatus 10 for cutting free the flank bones 11 is configured as disclosed herein.

In the event that fish 12 are processed with the abdominal cavity not yet opened, the belly knives 43 are additionally used to open the abdominal cavity.

In the following, the method principal in particular is explained in greater detail with reference to the drawing:

The fish 12 to be processed is beheaded and slaughtered before being placed on the transport saddle 14 so that the fish 12 to be processed preferably also has an opened abdominal cavity. The "headless" fish is then pushed onto the transport saddle 14 until a stop surface of the transport saddle 14 hits the end of the abdominal cavity. The fish 12 positioned in this way is preferably transported tail-first through a filleting machine 40. Preferably, one after another the dorsal spokes 42 are cut free up to the backbone 13, the ventral spokes 44 are cut free up to the backbone 13 and the flank bones 11 are cut free, in order to subsequently separate the fillets from the backbone 13 in the tail region by cutting through the ligament left around the backbone 13 when cutting free the dorsal and ventral spokes 42, 44.

According to the invention, the flank bones 11 are at least partially loosened in the region of their bone connection 21 to the backbone 13 before being cut free. At least the flank bones 11 located towards the head region are loosened on both sides of the backbone 13, preferably at least fractured. In other words, the fixed and rigid connection of the flank bones 11 to the backbone 13 is loosened or completely separated so that the flank bones 11 can be rotated out of their curved structure into a flat position/orientation, before the fish 12 to be processed reaches a cutting gap 39 of a separating unit 17 with its flank bones 11 for cutting free the flank bones 11.

A preferably selective load is applied for loosening the bone connection 21 between the flank bones 11 and the backbone 13 in order to separate the permanent connection. The selective load on the bone connection 21 preferably increases with the transport of the fish 12 to be processed in transport direction T. After loosening/fracturing/breaking through, the at least loosened flank bones 11 are rotated and guided into a cutting gap 39 formed between a separating means 18 and a counter unit 19 of a separating unit 17 for cutting free the flank bones 11.

The loosening or fracturing or complete breaking of the flank bones 11 with subsequent feeding of the flattened flank bones 11 into the cutting gap 39 can be carried out in a variety of ways. Particularly preferably, however, the method is carried out with a filleting machine 40 as described herein.

The invention claimed is:

1. An apparatus configured and adapted to cut free flank bones of beheaded, slaughtered fish which may have opened abdominal cavities and which are transported tail-first in a transport direction T with their backbone resting on transport saddles, the apparatus comprising:
    an upper bone guide which is configured and adapted to guide the backbone from a dorsal side of the fish to be processed;
    a lower bone guide which is configured and adapted to guide ventral spokes of the fish to be processed, which spokes are formed in a region from a tail to the abdominal cavity; and
    a separating unit for detaching fish fillets from the flank bones surrounding the abdominal cavity of the fish to be processed, wherein the separating unit comprises a separating means having a corresponding counter unit and can be brought from a standby position into a working position and vice versa; and
    a detaching device located in a region of the upper bone guide and configured and adapted to at least loosen a bone connection between the flank bones and the backbone of at least some of the flank bones.

2. The apparatus according to claim 1, wherein the detaching device is configured and adapted to at least loosen the bone connection between the flank bones and the backbone of at least the flank bones located towards a head region, i.e. at a head end of the abdominal cavity of the fish to be processed, on both sides of the backbone.

3. The apparatus according to claim 1, wherein the detaching device comprises at least two detaching elements which are positioned or arranged on opposing sides of the upper bone guide.

4. The apparatus according to claim 3, wherein each detaching element comprises a detaching section and a guiding section.

5. The apparatus according to claim 4, wherein the detaching section is arranged preceding the guiding section contrary to the transport direction T of the fish to be processed, in such a manner that the flank bones to be loosened first meet the detaching section at least for loosening the flank bones from the backbone and subsequently meet the guiding section for guiding the at least loosened flank bones into a cutting gap existing between the separating means and the counter unit of the separating unit.

6. The apparatus according to claim 5, wherein the detaching section is configured to be sharp-edged at least in sections at least on a detaching edge directed towards the flank bones, while the guiding section is configured to be blunt at least in sections to form a guiding edge.

7. The apparatus according to claim 6, wherein the sharp-edged detaching edge extends from a lower edge directed towards the flank bones into a region of a front edge pointing in an opposite direction to the transport direction T of the fish to be processed.

8. The apparatus according to claim 6, wherein the blunt guiding edge extends in extension of the sharp-edged detaching edge on a lower edge directed towards the flank bones, wherein the blunt guiding edge additionally has an extension transverse to the transport direction T to form a guiding chamfer.

9. The apparatus according to claim 6, wherein the lower edge of each detaching element, formed by the detaching edge and the guiding edge, is configured to slope downwards in the transport direction T of the fish to be processed.

10. The apparatus according to claim 3, wherein each detaching element is formed in one piece or in several parts.

11. The apparatus according to claim 3, wherein the detaching elements are each connected to the upper bone guide.

12. The apparatus according to claim 3, wherein the detaching elements are fixedly attached to the upper bone guide on a side directed away from a guiding gap of the upper bone guide.

13. The apparatus according to claim 12, wherein the attachment of the detaching elements to the upper bone guide is configured to be releasable.

14. A filleting machine for filleting beheaded, slaughtered fish that may have opened abdominal cavities, comprising:

back knives for exposing dorsal spokes up to a backbone;
belly knives for exposing ventral spokes, extending from a tail to an abdominal cavity, up to the backbone;
an apparatus for cutting free flank bones;
separating knives for separating fillets from the backbone in a tail region by cutting through a ligament around the backbon left by the belly and back knives;
an endless conveyor for transporting the fish tail-first as well as a number of transport saddles arranged on the conveyor for securely receiving the fish in their abdominal cavities;
wherein the apparatus for cutting free the flank bones is the apparatus according to claim 1.

15. A method for filleting beheaded, slaughtered fish that may have opened abdominal cavities, comprising the steps:
transporting the fish to be processed tail-first in transport direction T through a filleting machine;
cutting free dorsal spokes up to a backbone;
cutting free ventral spokes up to the backbone;
cutting free flank bones; and
separating fillets from the backbone in a tail region, by cutting through a ligament left around the backbone when cutting free the dorsal and ventral spokes;
wherein the flank bones are at least partially loosened in a region of their bone connection to the backbone before being cut free.

16. The method according to claim 15, wherein at least the flank bones located towards a head region are loosened on both sides of the backbone, preferably at least fractured.

17. The method according to claim 15, wherein a selective load is applied at least for loosening the bone connection between the flank bones and the backbone in order to separate a permanent connection.

18. The method according to claim 17, wherein the selective load on the bone connection increases with the transport of the fish to be processed in transport direction T.

19. The method according to claim 15, wherein the at least loosened flank bones are rotated and guided into a cutting gap formed between a separating means and a counter unit of a separating unit for cutting free the flank bones.

20. The method according to claim 15, wherein said method is carried out with a filleting machine according to claim 14.

* * * * *